US009046607B2

(12) United States Patent
Ohkado et al.

(10) Patent No.: US 9,046,607 B2
(45) Date of Patent: Jun. 2, 2015

(54) RADAR SYSTEM AND DETECTION METHOD

(75) Inventors: Makoto Ohkado, Nisshin (JP); Masaru Ogawa, Seto (JP); Isahiko Tanaka, Susono (JP); Koji Suzuki, Susono (JP); Atsushi Kawakubo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 173 days.

(21) Appl. No.: 13/704,790

(22) PCT Filed: Jun. 7, 2011

(86) PCT No.: PCT/IB2011/001253
§ 371 (c)(1),
(2), (4) Date: Dec. 17, 2012

(87) PCT Pub. No.: WO2011/158082
PCT Pub. Date: Dec. 22, 2011

(65) Prior Publication Data
US 2013/0088379 A1    Apr. 11, 2013

(30) Foreign Application Priority Data

Jun. 16, 2010  (JP) ................................ 2010-137205

(51) Int. Cl.
*G01S 13/93*  (2006.01)
*G01S 7/41*   (2006.01)
(Continued)

(52) U.S. Cl.
CPC ............... *G01S 13/931* (2013.01); *G01S 7/412* (2013.01); *G01S 13/345* (2013.01); *G01S 13/42* (2013.01); *G01S 13/08* (2013.01); *G01S 2013/9375* (2013.01)

(58) Field of Classification Search
CPC ...... G01S 13/931; G01S 13/345; G01S 13/42; G01S 13/343; G01S 7/4972; G01S 7/40; G01S 13/08; G01S 7/412; G01S 2013/9375
USPC ............................................ 342/70, 123, 148
See application file for complete search history.

(56) References Cited

U.S. PATENT DOCUMENTS 6,266,005 B1   7/2001   Schneider
6,429,804 B1   8/2002   Kishida et al.
(Continued)

FOREIGN PATENT DOCUMENTS

CN   100337120 C       9/2007
CN   101271158 A  *    9/2008
(Continued)

OTHER PUBLICATIONS

Combined Chinese Office Action and Search Report issued Nov. 14, 2013 in Patent Application No. 201180029617.0 (English Translation only).
International Search Report Issued Sep. 23, 2011 in PCT/IB11/01253 Filed Jun. 7, 2011.

*Primary Examiner* — John B Sotomayor
(74) *Attorney, Agent, or Firm* — Oblon, McClelland, Maier & Neustadt, L.L.P.

(57) ABSTRACT

A radar system includes an arithmetic processing unit, which sends a warning command to a warning device when a local minimum point of the intensity of the reflected wave from a target within a predetermined detection range is detected. By determining whether it is necessary to send a warning command based on whether there is a local minimum point of the intensity within the detection range, it is made possible to determine whether it is necessary to send a warning command more quickly as compared to the conventional system.

8 Claims, 9 Drawing Sheets

(51) Int. Cl.
 *G01S 13/34* (2006.01)
 *G01S 13/42* (2006.01)
 *G01S 13/08* (2006.01)

(56) References Cited

U.S. PATENT DOCUMENTS

| | | | | |
|---|---|---|---|---|
| 6,703,966 | B2 * | 3/2004 | Corbrion et al. | 342/104 |
| 6,825,756 | B2 * | 11/2004 | Bai et al. | 340/435 |
| 7,697,786 | B2 * | 4/2010 | Camus et al. | 382/286 |
| 8,482,457 | B2 * | 7/2013 | Aizawa | 342/149 |
| 8,866,665 | B2 * | 10/2014 | Suzuki | 342/79 |
| 2003/0052814 | A1 * | 3/2003 | Corbrion et al. | 342/104 |
| 2003/0076255 | A1 | 4/2003 | Ono | |
| 2006/0245653 | A1 * | 11/2006 | Camus et al. | 382/199 |
| 2008/0111733 | A1 | 5/2008 | Spyropulos et al. | |
| 2008/0129298 | A1 * | 6/2008 | Vaughan et al. | 324/322 |
| 2011/0006941 | A1 | 1/2011 | Samukawa et al. | |
| 2012/0229328 | A1 | 9/2012 | Aizawa | |

FOREIGN PATENT DOCUMENTS

| | | | | |
|---|---|---|---|---|
| DE | 19801617 A1 | * | 7/1999 | |
| EP | 0417939 A2 | * | 3/1991 | |
| EP | 1657567 A2 | * | 5/2006 | |
| EP | 1 923 717 A1 | | 5/2008 | |
| EP | 1923717 A1 | * | 5/2008 | ............. G01S 13/93 |
| GB | 677913 A | * | 8/1952 | |
| JP | 11-271427 | | 10/1999 | |
| JP | 2001-124848 A | | 5/2001 | |
| JP | 2001-515601 A | | 9/2001 | |
| JP | 2004 239744 | | 8/2004 | |
| JP | 2006 98220 | | 4/2006 | |
| JP | 2008 122391 | | 5/2008 | |
| JP | 2011-17634 A | | 1/2011 | |
| KR | 20020066390 A | * | 8/2002 | |
| WO | WO 9936796 A1 | * | 7/1999 | ............. G01S 13/42 |
| WO | 2011 064823 | | 6/2011 | |
| WO | 2011 158292 | | 12/2011 | |

\* cited by examiner

RADAR SYSTEM AND DETECTION METHOD

CROSS REFERENCE TO RELATED APPLICATIONS

The present application is a national stage application of PCT/IB11/001253 filed on Jun. 6, 2011, and claims the benefit of priority under 35 U.S.C. §119 of Japanese Application No. 2010-137205 filed on Jun. 16, 2010, the entire contents of which are incorporated herein by reference.

BACKGROUND OF THE INVENTION

1. Field of the Invention

The invention relates to a radar system that is mounted on a vehicle or the like and detects an obstacle and/or a preceding vehicle ahead, and to a detection method.

2. Description of Related Art

A vehicle has already been available, on which a radar system is mounted to detect obstacles and/or preceding vehicles ahead of the vehicle and determine the relative distance to the obstacles and/or the preceding vehicles.

The radar system is mounted in a front portion of the vehicle and a transmitting antenna of the radar system outputs a transmitted wave ahead of the vehicle. When the transmitted wave hits the obstacles, the preceding vehicles, etc. and is reflected therefrom, the reflected wave is received by a receiving antenna of the radar system. The reflection source, such as the preceding vehicles and the obstacles, is herein collectively referred to as the target.

After the reflected wave is received by the receiving antenna, an arithmetic processing unit in the radar system calculates the relative distance between the vehicle and the target based on the time lag (delay time) between the transmitted wave and the reflected wave. In addition, the arithmetic processing unit is connected to the warning device and when, based on the result of calculation of the relative distance, it is determined that the target can approach the vehicle and collide with the vehicle, the arithmetic processing unit sends a warning command to the warning device. The warning device that has received the warning command sounds the alarm or displays a warning message to prompt the driver to decelerate the vehicle and/or avoid the obstacles and/or the preceding vehicles.

When the height of the target is low and the vehicle can easily run over the target, that is, when the target is an iron plate on the road, for example, the vehicle would not collide with the target and therefore, there is no need to send the warning command to the warning device. Thus, when a target is detected, the height of the target is determined and it is determined whether it is necessary to send a warning command.

As a method of determining the height of the target, a method that utilizes the intensity (amplitude) of the reflected wave has already been available. It is known that the intensity of the reflected wave varies depending on the relative distance between the vehicle and the target and that the trend of the variation depends on the height of the target. Japanese Patent Application Publication No. 2008-122391 (JP-A-2008-122391) describes that a curve of the intensity of the reflected wave in relation to the relative distance between a radar system and a target is obtained through experiments or the like, the curve is obtained for each height of the target, and the curves for the respective heights are stored in a memory of the radar system. The curve of the intensity of the reflected wave that is detected by the radar system while the vehicle is driven and the plurality of curves for the respective heights that are stored in the memory are compared with each other (subjected to the pattern matching), the curve that is minimum in the difference from the curve of the reflected wave that is detected by the radar system is extracted from among the curves for the respective heights stored in the memory, and the height of the target corresponding to the extracted curve is assumed to be the height of the target that is detected by the radar system.

In the conventional technology, the processing time to perform the pattern matching is required. Specifically, there has been a problem that a delay time corresponding to the processing time occurs before a warning command is sent to the warning device and the time that can be used to avoid the target is correspondingly shortened.

SUMMARY OF THE INVENTION

The invention provides a radar system and a detection method, with which it is possible to reduce the processing time by the amount of time that is used to perform the pattern matching etc. and it is therefore possible to quickly determine whether it is necessary to send a warning command.

A first aspect of the invention is a radar system including: an oscillator that oscillates to generate a transmitted wave; a transmitting antenna that outputs the transmitted wave; a receiving antenna that receives a reflected wave from a target; and an arithmetic processing unit that calculates an intensity of the reflected wave and determines a relative distance to the target. A detection range with respect to the relative distance is set in advance in the arithmetic processing unit, and the arithmetic processing unit performs a predetermined process when the intensity of the reflected wave associated with the relative distance has a local minimum point within the detection range. Examples of the predetermined process include sending a warning command to a warning device to sound an alarm and/or control the host vehicle to decelerate the host vehicle and/or avoid a preceding vehicle or an obstacle.

In the above aspect, as the predetermined process, the arithmetic processing unit may calculate a height of the target based on the number of the local minimum point or points of the intensity within the detection range.

In the above aspect, as the predetermined process, the arithmetic processing unit may calculate a height of the target based on a value of the relative distance corresponding to the local minimum point of the intensity within the detection range.

In the above aspect, the radar system may be mounted in a vehicle, and the detection range may be set so that the local minimum point is not detected for the target that is lower than a bottom height of the vehicle and the local minimum point is detected for the target that is equal to or higher than the bottom height of the vehicle.

In the above aspect, the radar system may further include an angle detector that determines an angle of incidence of the reflected wave incident on the receiving antenna and that reduces noise of the reflected wave by excluding the reflected wave, the angle of incidence of which is out of a predetermined horizontal incident angle range.

As described above, with a radar system according to the first aspect of the invention, it becomes possible to reduce the processing time by the amount of time that is used to perform the pattern matching used in the conventional technology and it is therefore possible to correspondingly quickly determine whether it is necessary to issue a warning.

A second aspect of the invention is a detection method including: outputting a transmitted wave; receiving, from a target, a reflected wave of the transmitted wave; calculating an intensity of the reflected wave; determining a relative distance to the target; and performing a predetermined process when the intensity of the reflected wave associated with the relative distance has a local minimum point within a predetermined detection range.

In the above aspect, as the predetermined process, the detection method may further include calculating a height of the target based on the number of the local minimum point or points of the intensity within the detection range.

In the above aspect, as the predetermined process, the detection method may further include calculating a height of the target based on a value of the relative distance corresponding to the local minimum point of the intensity within the detection range.

In the above aspect, the detection range may be set so that the local minimum point is not detected for the target that is lower than a predetermined bottom height and the local minimum point is detected for the target that is equal to or higher than the predetermined bottom height.

In the above aspect, the detection method may further include determining an angle of incidence of the reflected wave; and reducing noise of the reflected wave by excluding the reflected wave, the angle of incidence of which is out of a predetermined horizontal incident angle range.

Also with a detection method according to the second aspect of the invention, effects similar to those brought about by the radar system according to the first aspect of the invention are brought about.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
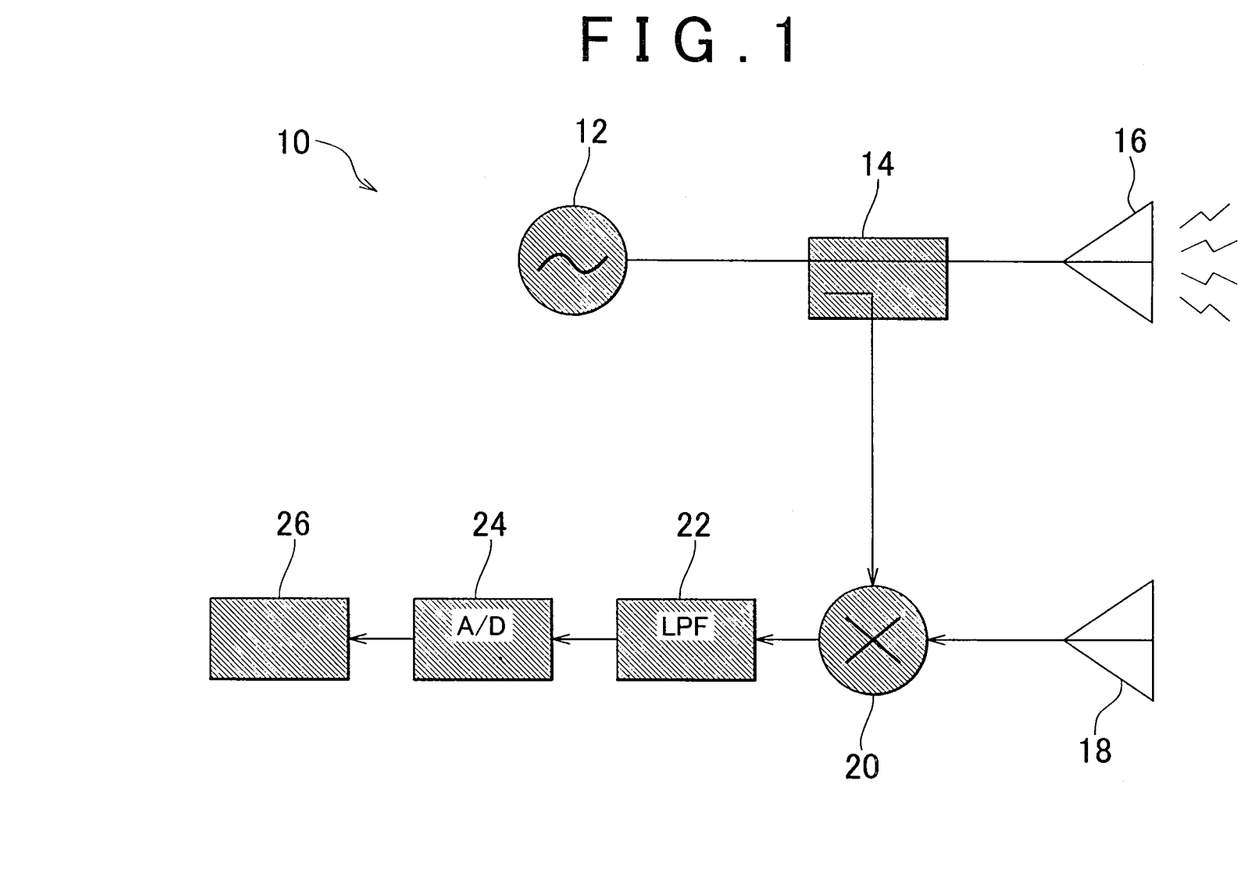
FIG. 1 is a diagram showing a radar system according to an embodiment.

A configuration of a radar system according to an embodiment will be described with reference to FIG. 1. The radar system 10 is mounted in a front portion of a vehicle (not shown). The radar system 10 is a frequency-modulated continuous wave (FM-CW) radar and includes a variable frequency oscillator 12 to output a frequency modulated wave.

The oscillator 12 is connected to a transmitting antenna 16 via a distributor 14. The radar system 10 includes a receiving antenna 18, which is connected to a mixer 20. The mixer 20 is also connected to the above-described distributor 14 and is further connected to a filter circuit 22 having a low-pass filter. The filter circuit 22 is connected to an analogue-to-digital (A/D) converter 24, which is connected to an arithmetic processing unit 26.

Figure 2:
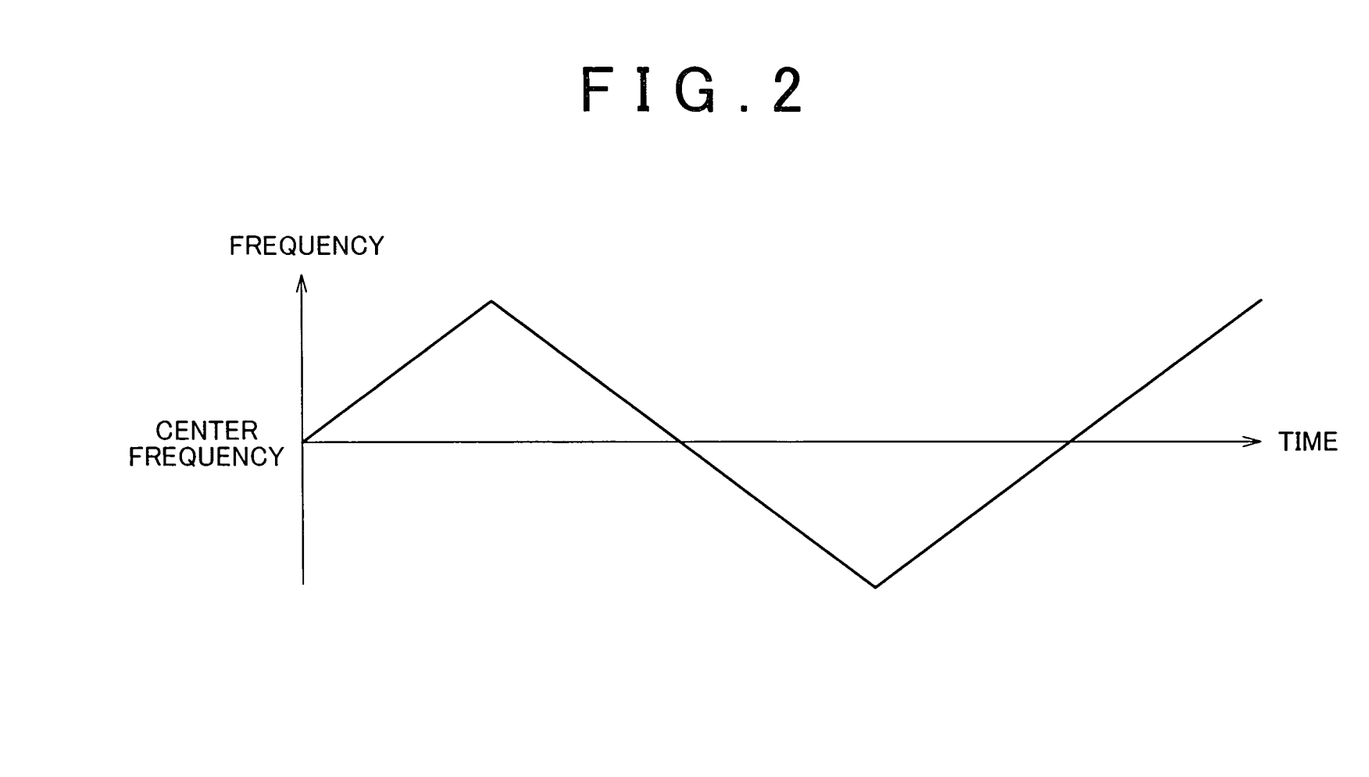
FIG. 2 is a diagram showing a waveform of a transmitted wave.

Next, operations of respective components of the radar system 10 will be described. The oscillator 12 modulates oscillation frequency to generate a transmitted wave, which is an FM wave. Specifically, the oscillator 12 modulates the transmitted wave so that the waveform of the transmitted wave becomes a triangular wave as shown in FIG. 2. In this embodiment, the band of the oscillation frequency of the oscillator 12 is set to frequencies between 30 GHz and 300 GHz so that the transmitted wave becomes a millimeter wave (wave length ranging from 1 mm to 10 mm). In FIG. 2, the oscillation frequency is modulated within a width of 0.3 GHz (half width is 0.15 GHz) with a center frequency of 76 GHz.

The transmitting antenna 16 outputs the transmitted wave generated by the oscillator 12. In this embodiment, in order to avoid the reflection from targets that are significantly off the travel direction of the vehicle, the angular range of the output of the transmitted wave from the transmitting antenna 16 is narrowed to a predetermined angle range. In this embodiment, the output angular range of the transmitted wave is set to 7.0° to 7.5° in either of the horizontal direction and the vertical direction. In this way, the horizontal range of the transmitted wave is within a range of approximately 3.0 to 3.2 m even at a point 50 meters distant from the radar system 10 (that is, from a front portion of the vehicle), for example.

Figure 3:
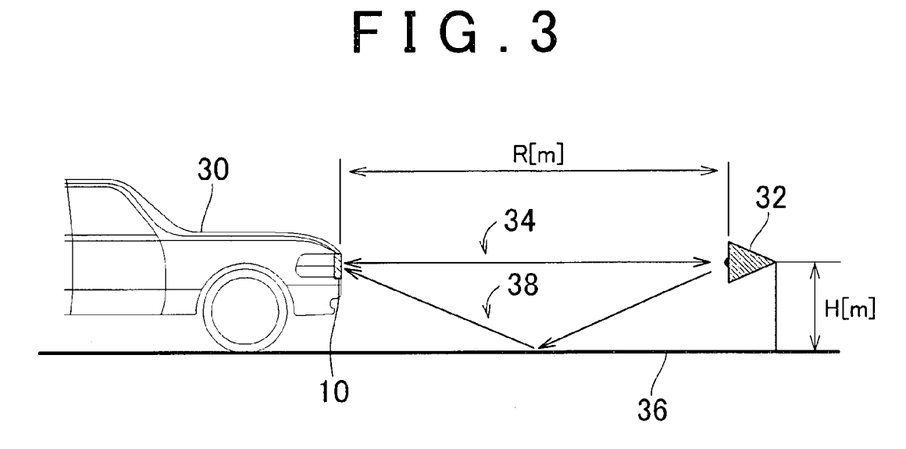
FIG. 3 is a diagram showing a direct reflected wave and an indirect reflected wave.

As shown in FIG. 3, when there is a target 32, such as a preceding vehicle or an obstacle, ahead of the vehicle 30, the transmitted wave is reflected from the target 32. The receiving antenna 18 receives the reflected wave. The reflected wave is classified into a direct reflected wave 34 that directly travels from the target 32 to the receiving antennal 18 and an indirect reflected wave 38 that travels from the target 32 to the receiving antenna 18 after being once reflected from a road surface 36. The receiving antenna 18 receives, as the reflected wave, a composite wave of the direct reflected wave 34 and the indirect reflected wave 38. Because the direct reflected wave 34 and the indirect reflected wave 38 differ from each other in the path length from the target 32 to the receiving antenna 18, the direct reflected wave 34 and the indirect reflected wave 38 interfere with each other and the intensity (amplitude) I of the reflected wave resulting from the composition of both of the waves varies depending on the level of interference. The level of interference varies depending on the path length from the target 32 to the receiving antenna 18. Specifically, the intensity I of the reflected wave varies depending on the height, H, of the target 32 and the relative distance between the receiving antenna 18 and the target 32.

Figure 4:
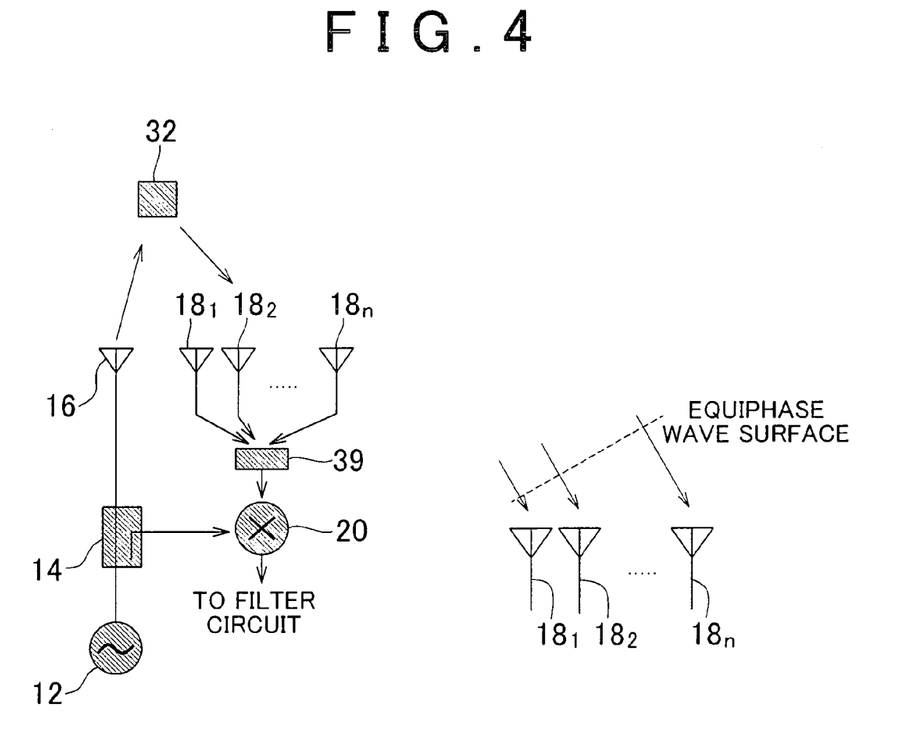
FIG. 4 is a diagram showing a means for narrowing the angle of incidence of the reflected wave.

In addition to the direct reflected wave 34 and the indirect reflected wave 38, signals from, for example, roadside units for measuring the volume of traffic that are provided on roads, the reflected wave from, for example, guard rails present in the transverse direction with respect to the travel direction, etc. can be received by the receiving antenna 18. Thus, in order to exclude the signals other than the direct reflected wave 34 and the indirect reflected wave 38, the receiving antenna 18 may include an incident angle limiting means for limiting the angle of incidence of the signals incident on the receiving antenna 18. Specifically, as shown in FIG. 4, a plurality of receiving antennas $18_1$ to $18_n$ are arranged in the horizontal direction and an angle detector 39 is provided that is connected to the receiving antennas $18_1$ to $18_n$ and receives signals therefrom. The angle detector 39 calculates the angle of incidence of the received signals incident on the receiving antennas $18_1$ to $18_n$ by performing calculation by the multiple signal classification (MUSIC) algorithm or by the estimation of signal parameters via rotational invariance techniques (ESPRIT) algorithm. In this embodiment, the condition concerning the angle of incidence that determines the horizontal incident angle range of the reflected wave incident on the receiving antennas $18_1$ to $18_n$ (by which, for example, the horizontal incident angle is limited to within ±5° when the angle parallel to the travel direction of the vehicle is zero) is stored in a memory (not shown) of the angle detector 39. When the angle detector 39 receives the signals from the receiving antennas $18_1$ to $18_n$, the angle detector 39 compares the incident angle condition and the angle of incidence of the received signal incident on the receiving antennas $18_1$ to $18_n$. When the angle of incidence is greater than the angle set in the incident angle condition, the angle detector 39 discards the received signal. On the other hand, when the angle of incidence satisfies the incident angle condition, the angle detector 39 transmits the received signal to the mixer 20.

Referring back to FIG. 1, the reflected wave received by the receiving antenna 18 is transmitted to the mixer 20. The mixer 20 is connected to the distributor 14, and the transmitted wave output from the oscillator 12 is sent to the mixer 20 via the distributor 14.

In the mixer 20, a beat signal obtained by mixing the transmitted wave 40 and the reflected wave 42 is generated. The beat signal is a signal of the beat that is caused by the difference in frequency between the transmitted wave 40 and the reflected wave 42, which is caused by the delay time (time lag) of the reflected wave 42 with respect to the transmitted wave 40. The beat signal is passed through the filter circuit 22 and is converted into a digital signal via the A/D converter 24, and is then transmitted to the arithmetic processing unit 26. The arithmetic processing unit 26 calculates the relative distance R between the target 32 and the vehicle 30 based on the beat signal.

Figure 5:
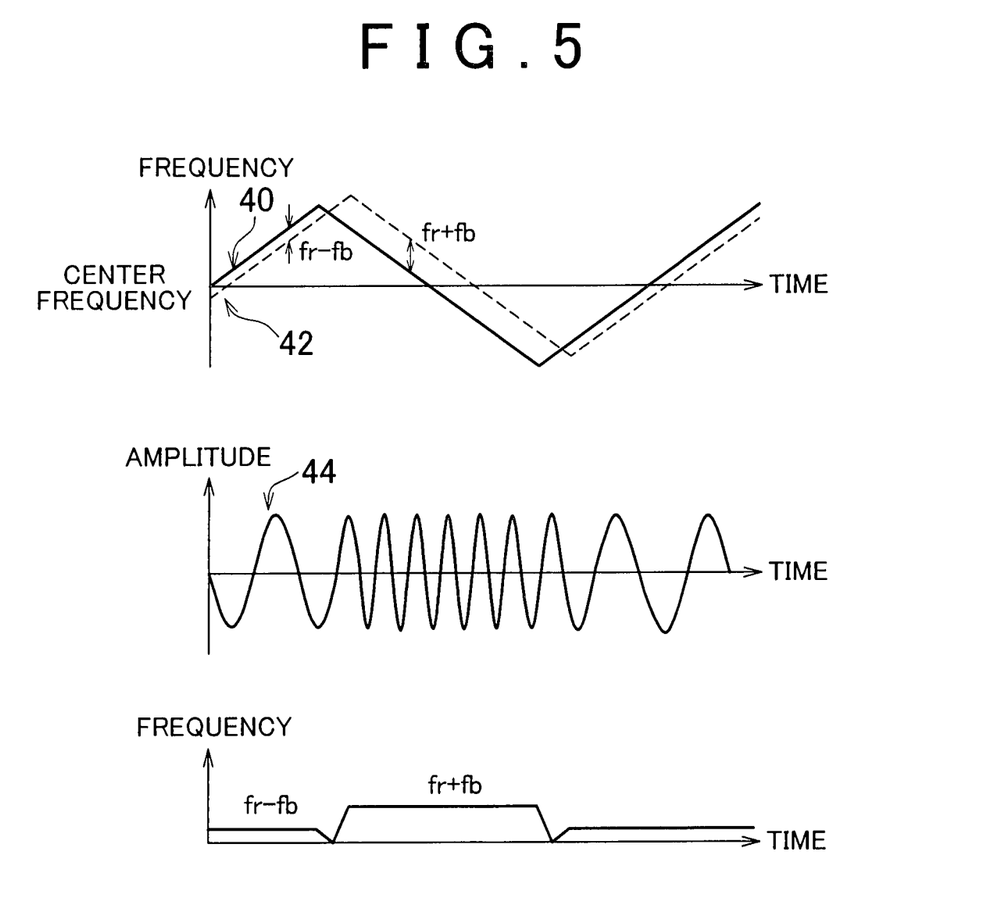
FIG. 5 shows diagrams for explaining a method of determining a relative distance between a vehicle and a target.

A method of determining the relative distance R between the vehicle 30 and the target 32 based on the beat signal will be described below. Because the vehicle 30 is running, due to the influence of the Doppler effect, the reflected wave 42 is offset in the vertical axis (frequency) direction relative to the transmitted wave 40 as shown in the upper diagram of FIG. 5. When the beat frequency is $f_r$ and the Doppler frequency is $f_b$, the amount of offset changes between $f_r+f_b$ and $f_r-f_b$ every half cycle. Thus, as shown in the middle and lower diagrams of FIG. 5, the frequency of the beat signal 44 that is obtained by mixing the transmitted wave 40 and the reflected wave 42 also changes between $f_r+f_b$ and $f_r-f_b$ every half cycle. With the use of this phenomenon, the beat signal 44 is converted to the frequency domain by the fast Fourier transform (FFT), for example, to obtain the value of $f_r+f_b$ and the value of $f_r-f_b$, whereby it is made possible to obtain the beat frequency $f_r$.

Figure 6:
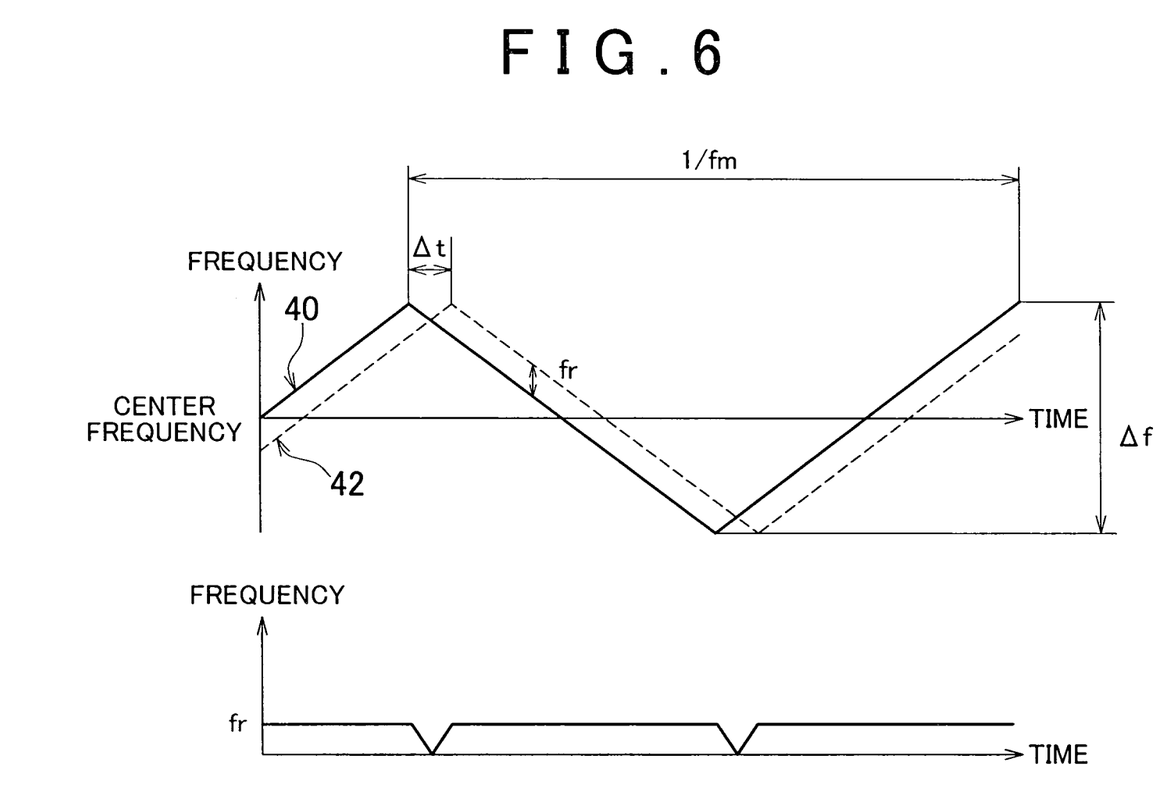
FIG. 6 is a diagram for explaining the method of determining the relative distance between the vehicle and the target.

The waveforms of the transmitted wave 40 and the reflected wave 42 when the influence of the Doppler effect is eliminated are shown in the upper diagram of FIG. 6. The variation of the frequency of the beat signal 44 in this case is shown in the lower diagram of FIG. 6. As shown in the upper diagram of FIG. 6, there is a delay time Δt between the transmitted wave 40 and the reflected wave 42. When the propagation velocity of the transmitted wave 40 and the reflected wave 42 is c, which is the speed of light, 3×10⁸ m/s, for example, the relative distance (radial distance) R between the vehicle 30 and the target 32 is expressed by the following Equation (1):

$$R = \frac{c\Delta t}{2}. \tag{1}$$

In addition, when the modulation repetition period (given) of the transmitted wave 40 is $1/f_m$ and the modulation frequency range (given) is Δf, the following Equation (2) is derived from the geometrical relations in the upper diagram of FIG. 6.

$$\Delta t = \frac{f_R}{2 f_m \cdot \Delta f} \tag{2}$$

The following Equation (3) is derived from the Equations (1) and (2). The relative distance R can be determined from the Equation (3).

$$R = \frac{c \cdot f_r}{4 f_m \cdot \Delta f} \tag{3}$$

The arithmetic processing unit 26 determines the relative distance R between the vehicle 30 and the target 32 by performing the above described calculations.

The arithmetic processing unit 26 determines the relative distance R between the vehicle 30 and the target 32 and at the same time, acquires the signal intensity (amplitude) I of the reflected wave 42. The acquired intensity I is stored in the memory (not shown) in association with the relative distance R.

As described above, the signal intensity I of the reflected wave varies depending on the relative distance R to the target 32 and the height H of the target 32. In this embodiment, the signal intensity I of the reflected wave when the relative distance R and the height H of the target 32 are variously changed is estimated using simulation, and based on the result of this estimation, the relative distance R, and the signal intensity I of the reflected wave, the height H of the target 32 is estimated.

The signal intensity I of the reflected wave can be expressed by the sum of the intensity $I_{r1}$ of the direct reflected wave 34 and the intensity $I_{r2}$ of the indirect reflected wave 38. The intensity $I_{r1}$ of the direct reflected wave 34 can be expressed by the following Equation (4):

$$I_{r1} = P_{r1} \cdot \cos(2\pi f_1 t) \tag{4}$$

$$\text{where } P_{r1} = \frac{P_t \cdot G^2 \cdot \lambda^2 \cdot \sigma}{(4\pi)^3 \cdot R^4}.$$

Note that $P_{r1}$ represents the received electric power due to the direct reflected wave 34, and $f_1$ represents the beat frequency of the direct reflected wave 34. In addition, $P_t$ represents the transmitted electric power, G represents the gain, λ represents the wave length, σ represents the radar cross section (RCS), and R represents the relative distance between the vehicle 30 and the target 32.

The intensity $I_{r2}$ of the indirect reflected wave 38 can be expressed by the following Equation (5):

$$I_{r2} = P_{r2} \cdot \cos(2\pi f_2 t - \phi) \quad (5)$$

$$\text{where } P_{r2} = A \cdot \frac{P_t \cdot G^2 \cdot \lambda^2 \cdot \sigma}{(4\pi)^3 \cdot \left(\sqrt{R^2 + (2H)^2}\right)^4},$$

$$\text{and } \phi = \frac{4\pi}{\lambda} \cdot \frac{R - \sqrt{R^2 + (2H)^2}}{c}.$$

Note that $P_{r2}$ represents the received electric power due to the indirect reflected wave 38, and $f_2$ represents the beat frequency of the indirect reflected wave 38. In addition, A represents the road surface reflection coefficient and H represents the height of the target 32. In addition, $\phi$ represents the phase difference between the direct reflected wave 34 and the indirect reflected wave 38 and c represents the propagation velocity of the millimeter wave. The signal intensity I of the reflected wave 42 can be expressed by the following Equation (6) based on the Equations (4) and (5).

$$I = I_{r1} + I_{r2} = P_{r1} \cdot \cos(2\pi f_1 t) + P_{r2} \cdot \cos(2\pi f_2 t - \phi) \quad (6)$$

Figure 7:
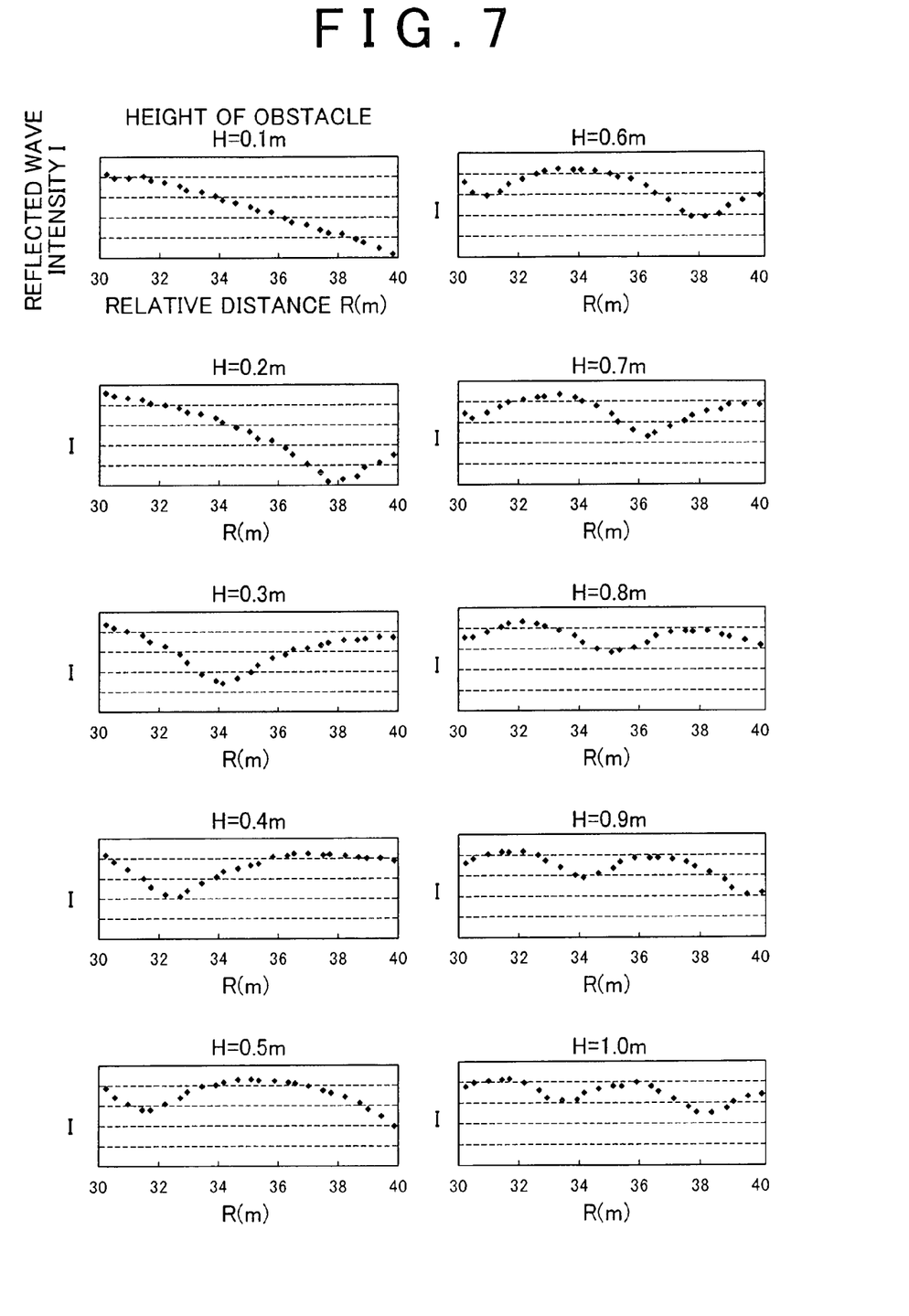
FIG. 7 is a diagram showing a curve of the intensity of the reflected wave when the height of the target is changed.

The results of simulation using the Equations (4) to (6) are shown in FIG. 7. In FIG. 7, a range of the relative distance R (the range is hereinafter referred to as the "detection range") is delimited and the curves of the intensity I of the reflected wave 42 when the height H of the target 32 is variously changed within the detection range are shown. In this embodiment, the detection range is a range between R=30 m and R=40 m. In the simulation, the minimum height of the target 32 is set to 0.1 m, the height H of the target 32 is raised in increments of 0.1 m, and the maximum height thereof is set to 1.0 m. The center frequency of the transmitted wave is set to 76 GHz. The transmitted electric power $P^t$ is set to 10 dBm, the gain G is set to 20 dBi, and the RCS $\sigma$ is set to 10 dBsm.

Referring to FIG. 7, although there is no local minimum point in the curve of the intensity I when the height H of the target 32 is 0.1 m, a local minimum point of the intensity I appears at the point, at which the relative distance R equals 38 m, when the height H of the target 32 becomes 0.2 m. It can be seen that in all the cases of the target 32, the height H of which is equal to or higher than 0.2 m, there is a local minimum point.

Note that it can be seen from FIG. 7 that the position of the local minimum point drifts from the minimum value (R=30) side to the maximum value (R=40) side in the detection range as the height of the target 32 decreases. Thus, the height H of the target 32 that causes the local minimum point to appear at the maximum value within the detection range, is the detectable minimum height in the detection range. It can be seen from FIG. 7 that the minimum height of the target 32 that causes the local minimum point to appear within the detection range, is between 0.1 m and 0.2 m because a local minimum point appears at the point, at which the relative distance R equals 38 m, when the height H of the target 32 is 0.2 m and no local minimum point appears when the height H of the target is 0.1 m. In consideration of the fact that the minimum height, which is the height of the bottom of the vehicle 30 from the ground surface, is generally designed to be equal to or higher than 0.2 m, the target 32 that is lower, than this minimum height has a height such that a vehicle can run over the target 32. Thus, it can be understood that there is no need to send a warning command unless the local minimum point is detected within the detection range and it is necessary to send the warning command to a warning device when the local minimum point is detected. As described above, with the use of simulation, it is possible to determine, in advance, the detection range so that no local minimum point is detected in the case of a target, the height of which is lower than a limit height $h_L$ such that a vehicle can run over the target, and a local minimum point is detected in the case of a target, the height of which is equal to or higher than the limit height $h_L$ for the vehicle.

The above-described detection range is set in advance in the arithmetic processing unit 26. The arithmetic processing unit 26 calculates the actual relative distance R between the vehicle 30 and the target 32 and the actual reflected wave intensity I and, when the value of the relative distance R is within the detection range, the arithmetic processing unit 26 monitors the curve of the reflected wave intensity I associated with the relative distance R. In addition, the arithmetic processing unit 26 detects whether there is a local minimum point in the curve. By detecting whether there is a local minimum point, it is possible to determine whether the height of the target 32, which is the reflection source of the reflected wave, is such that the vehicle 30 can run over the target 32. In addition, it is possible to determine whether it is necessary to send the warning command, based on the determination result.

Figure 8:
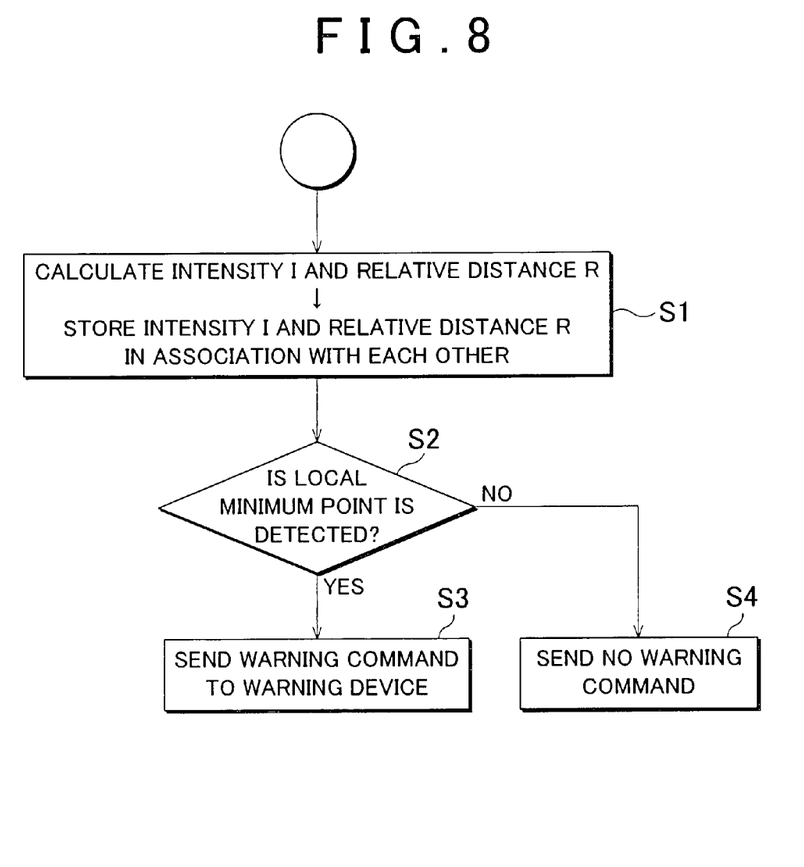
FIG. 8 is a diagram showing a flow chart to determine whether it is necessary to send a warning command.

FIG. 8 shows a flow chart, according to which the arithmetic processing unit 26 is caused to perform the above-described determination process. First, the arithmetic processing unit 26 calculates the intensity I of the reflected wave 42 and stores the intensity I into a memory or the like (not shown) in association with the relative distance R between the vehicle 30 and the target 32 (S1). In this step, a configuration may be employed, in which the intensity I associated with the relative distance R out of the detection range is not stored (discarded) in order to reduce the required storage capacity of the memory.

Next, it is determined whether a local minimum point is detected in the curve of the intensity I within the predetermined detection range (S2). Specifically, when it is assumed that I(x) is the intensity at a coordinate x, I(x) that satisfies the conditions, $I(x) < I(x-\Delta x)$ and $I(x) < I(x+\Delta x)$, is determined to be the local minimum point.

When the intensity I(x) that satisfies the above conditions appears within the detection range, the arithmetic processing unit 26 immediately sends the warning command to the warning device (not shown) that is connected to the arithmetic processing unit 26 (S3). In this way, the arithmetic processing unit 26 prompts the driver to decelerate the vehicle or to avoid the target 32. When no local minimum point is detected within the detection range, the arithmetic processing unit 26 does not send the warning command to the warning device (S4). Note that in addition to or instead of sending the warning command to the warning device in S3, the vehicle may be decelerated and/or the tension of the seat belt may be increased, by sending the warning command to the control unit that controls the vehicle.

As described above, in this embodiment, the detection range is determined in advance and it is determined whether it is necessary to issue a warning based on the result of determination as to whether there is a local minimum point of the intensity I within the detection range. Thus, it is made unnecessary to perform pattern matching of the curve as in the case of the conventional technology when it is determined whether it is necessary to issue a warning, so that it becomes possible to reduce the processing time by the amount of time that is used to perform the pattern matching. As a result, it becomes possible to determine whether it is necessary to issue a warning, more rapidly as compared to the case of the conventional technology.

Note that although, in the flow chart of FIG. 8, it is determined whether it is necessary to issue a warning based on the existence of the local minimum point, a configuration may be employed, in which after the entire curve within the detection range is obtained, the height H of the target 32 is determined based on the number of local minimum point(s) and the position(s) thereof within the detection range, and it is then determined whether it is necessary to issue a warning.

As shown in FIG. 7, as the height of the target 32 increases, the point, at which the local minimum point of the intensity I appears, gradually drifts from the maximum value (R=40) side to the minimum value (R=30) side within the detection range. In other words, the smaller the value of the relative distance R corresponding to the local minimum point is, the higher the target 32 is.

In addition, the higher the target 32 is, the greater the number of local minimum point(s) within the detection range is. In FIG. 7, the number of local minimum point is one when the height of the target 32 is in the range of 0.2 m to 0.5 m, and the number of local minimum points is two when the height of the target 32 is in the range of 0.6 m to 1.0 m.

Figure 9:
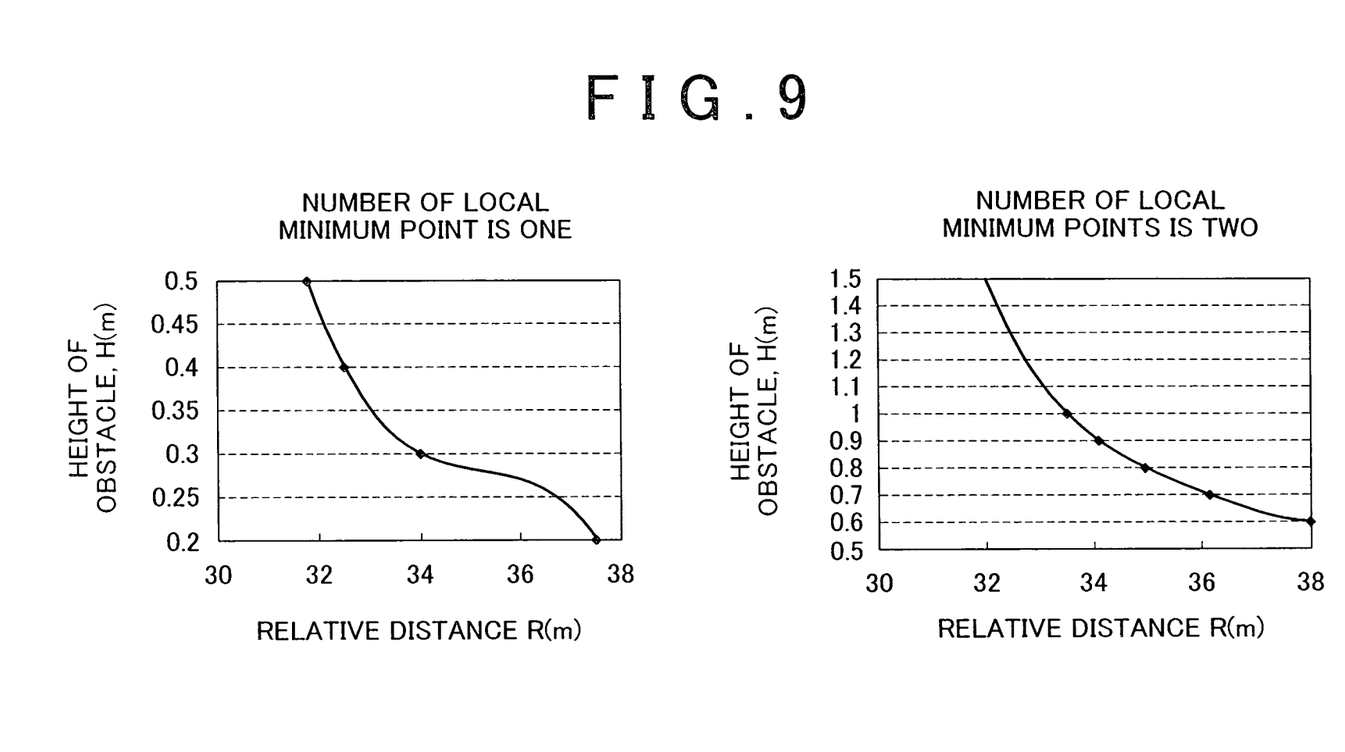
FIG. 9 shows diagrams that show the relations between the relative distance between the vehicle and the target and the height of the target.

The left graph of FIG. 9 shows how the local minimum point drifts when there is one local minimum point and the right graph of FIG. 9 shows how the local minimum point on the side closer to the maximum value (R=40 m) in the detection range drifts when there are two local minimum points. By referring to these graphs, the number of local minimum point(s) and the position(s) of the local minimum point(s), it is possible to obtain the height of the target 32 and determine whether it is necessary to send the warning command.

Figure 10:
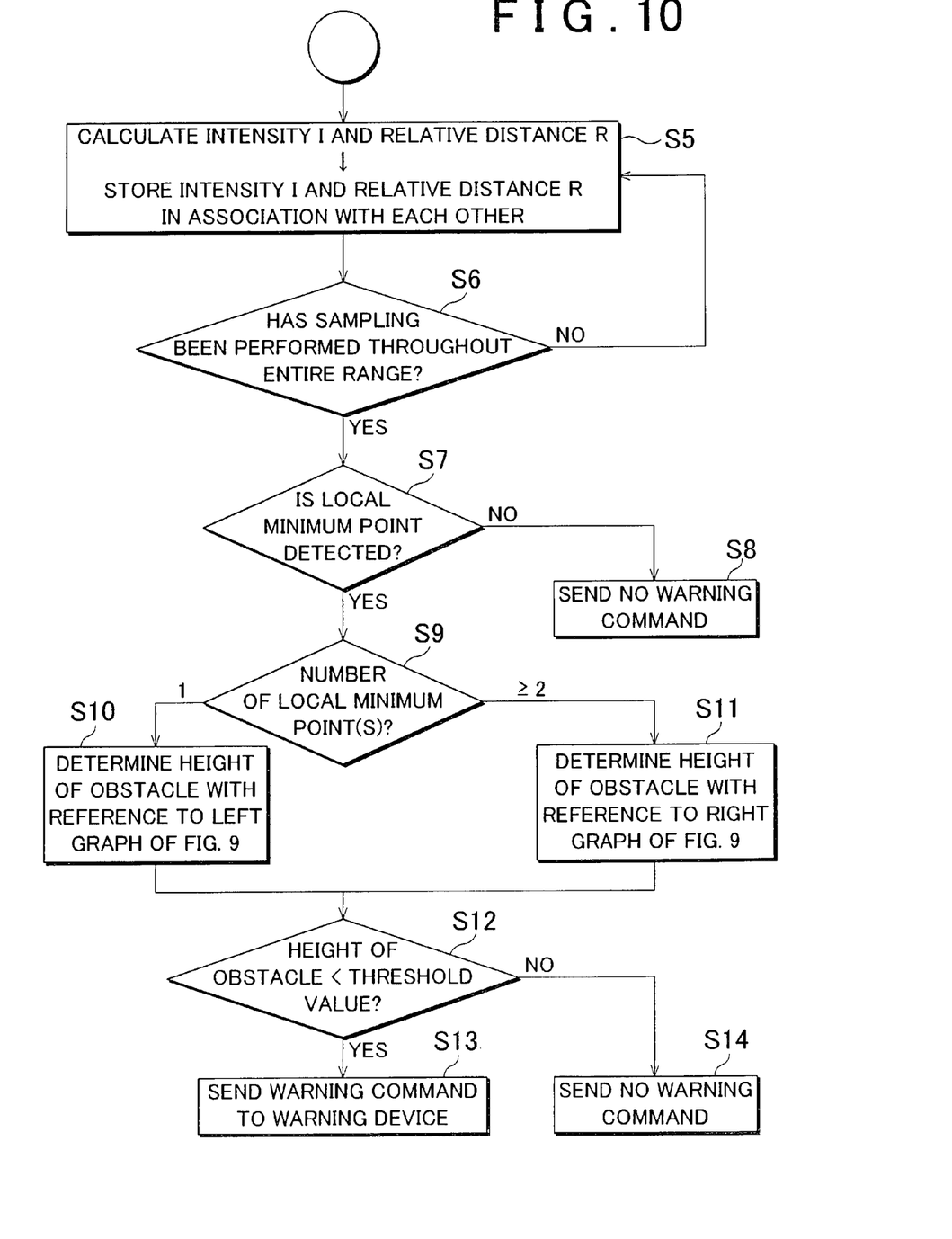
FIG. 10 is a diagram showing a flow chart to determine whether it is necessary to send a warning command.

FIG. 10 shows a flow chart, according to which the arithmetic processing unit 26 performs the above-described determination. The arithmetic processing unit 26 calculates the intensity I of the reflected wave 42 and stores the intensity I in association with the relative distance R between the vehicle 30 and the target 32. This process is performed throughout the entire detection range (S5, S6). Next, the arithmetic processing unit 26 detects the local minimum point of the intensity I within the detection range (S7). When no local minimum point is detected, or counted, the arithmetic processing unit 26 does not send the warning command to the warning device (S8). On the other hand, when a local minimum point is detected, the number of local minimum point(s) is determined (S9). When the number of local minimum point is one, the value of the relative distance R corresponding to the local minimum point is extracted and with reference to the left graph of FIG. 9, or a table corresponding to this graph, stored in a memory (not shown), the height H of the target 32 is determined (S10). When the number of local minimum points is two, the value of the relative distance R corresponding to one of the two local minimum points that is on the side closer to the maximum value (R=40 m) is extracted and with reference to the right graph of FIG. 9, or a table corresponding to this graph, stored in a memory (not shown), the height H of the target 32 is determined (S11). Next, the height H of the target 32 obtained in S10 or S11 is compared with a predetermined threshold value stored in a memory or the like (not shown)(S12). When the height H of the target 32 exceeds the threshold value, the arithmetic processing unit 26 sends a warning command to the warning device (S13). When the height H of the target 32 is equal to or lower than the threshold value, the arithmetic processing unit 26 does not send the warning command (S14).

The operation time taken to count the number of local minimum point(s) and extract the value of the relative distance R, corresponding to the local minimum point, within the detection range is significantly shorter than that taken to perform the conventional pattern matching, so that it is possible to perform the determination as to whether it is necessary to issue a warning more rapidly than in the case of the conventional technology by performing the determination process shown in FIG. 10 by way of example.

When the possible, or conceivable, height of the target 32 is equal to or lower than 0.5 m, the number of local minimum point(s) within the detection range does not become greater than one and therefore, the height of the target 32 may be detected based on the trend of the drift of the local minimum point only. When it suffices that the detection of the height of the target 32 is performed with regard to the following three cases: a case where the number of local minimum point is zero (0 m to 0.2 m); a case where the number of local minimum point is one (0.2 m to 0.5 m); and a case where the number of local minimum points is two (0.5 m to 1.0 m), the detection of the height of the target 32 may be performed by merely counting the number of local minimum points.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A radar system for a vehicle, which is for determining a height of a target, comprising:
   an oscillator that is configured to oscillate to generate a transmitted wave;
   a transmitting antenna that is configured to output the transmitted wave;
   a receiving antenna that is configured to receive a reflected wave from the target; and
   an arithmetic processing unit that is configured to calculate an intensity of the reflected wave and to determine a relative distance to the target, wherein
   the arithmetic processing unit is configured to detect whether a curve of the intensity of the reflected wave associated with the relative distance has a local minimum point within a detection range of the relative distance to the target, wherein the detection range is set in the arithmetic processing unit in advance, and
   the arithmetic processing unit is configured to determine the height of the target based on a value of the relative distance corresponding to the local minimum point of the intensity within the detection range, with reference to an association between (i) the intensity, (ii) a relative distance between the vehicle and the target, and (iii) the height of the target.

2. The radar system according to claim 1, wherein
   the radar system is mounted in a vehicle, and
   the detection range is set so that the local minimum point is not detected for the target that is lower than a bottom height of the vehicle and the local minimum point is detected for the target that is equal to or higher than the bottom height of the vehicle.

3. The radar system according to claim 1, further comprising an angle detector that is configured to determine an angle of incidence of the reflected wave incident on the receiving antenna and to reduce noise of the reflected wave by excluding the reflected wave, the angle of incidence of which is out of a predetermined horizontal incident angle range.

4. A detection method for a vehicle, which is for determining a height of a target, comprising:
- outputting a transmitted wave;
- receiving, from the target, a reflected wave of the transmitted wave;
- calculating, with a processor, an intensity of the reflected wave;
- determining, with the processor, a relative distance to the target;
- detecting, with the processor, whether a curve of the intensity of the reflected wave associated with the relative distance has a local minimum point within a predetermined detection range of the relative distance to the target, wherein the detection range is set in advance; and
- determining, with the processor, the height of the target based on a value of the relative distance corresponding to the local minimum point of the intensity within the detection range, with reference to an association between (i) the intensity, (ii) a relative distance between the vehicle and the target, and (iii) the height of the target.

5. The detection method according to claim 4, wherein determining the height of the target in accordance with the one local minimum point is based on a number of the local minimum point or points of the intensity within the detection range.

6. The detection method according to claim 4, wherein the detection range is set so that the local minimum point is not detected for the target that is lower than a predetermined bottom height and the local minimum point is detected for the target that is equal to or higher than the predetermined bottom height.

7. The detection method according to claim 4, further comprising:
- determining an angle of incidence of the reflected wave; and
- reducing noise of the reflected wave by excluding the reflected wave, the angle of incidence of which is out of a predetermined horizontal incident angle range.

8. A radar system for a vehicle, which is for determining a height of a target, comprising:
- an oscillator that is configured to oscillate to generate a transmitted wave;
- a transmitting antenna that is configured to output the transmitted wave;
- a receiving antenna that is configured to receive a reflected wave from the target; and
- circuitry that is configured to:
    - calculate an intensity of the reflected wave and to determine a relative distance to the target, wherein
    - detect whether a curve of the intensity of the reflected wave associated with the relative distance has a local minimum point within a detection range of the relative distance to the target, wherein the detection range is set in the arithmetic processing unit in advance, and
    - determine the height of the target based on a value of the relative distance corresponding to the local minimum point of the intensity within the detection range, with reference to an association between (i) the intensity, (ii) a relative distance between the vehicle and the target, and (iii) the height of the target.

* * * * *